Patented Feb. 16, 1932

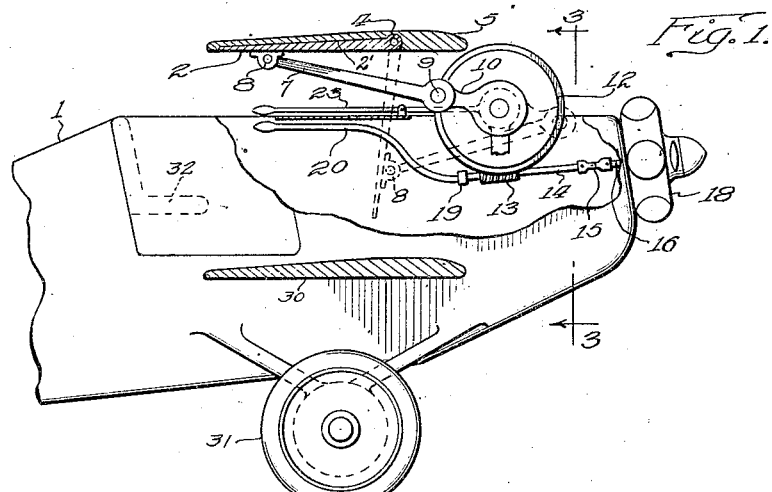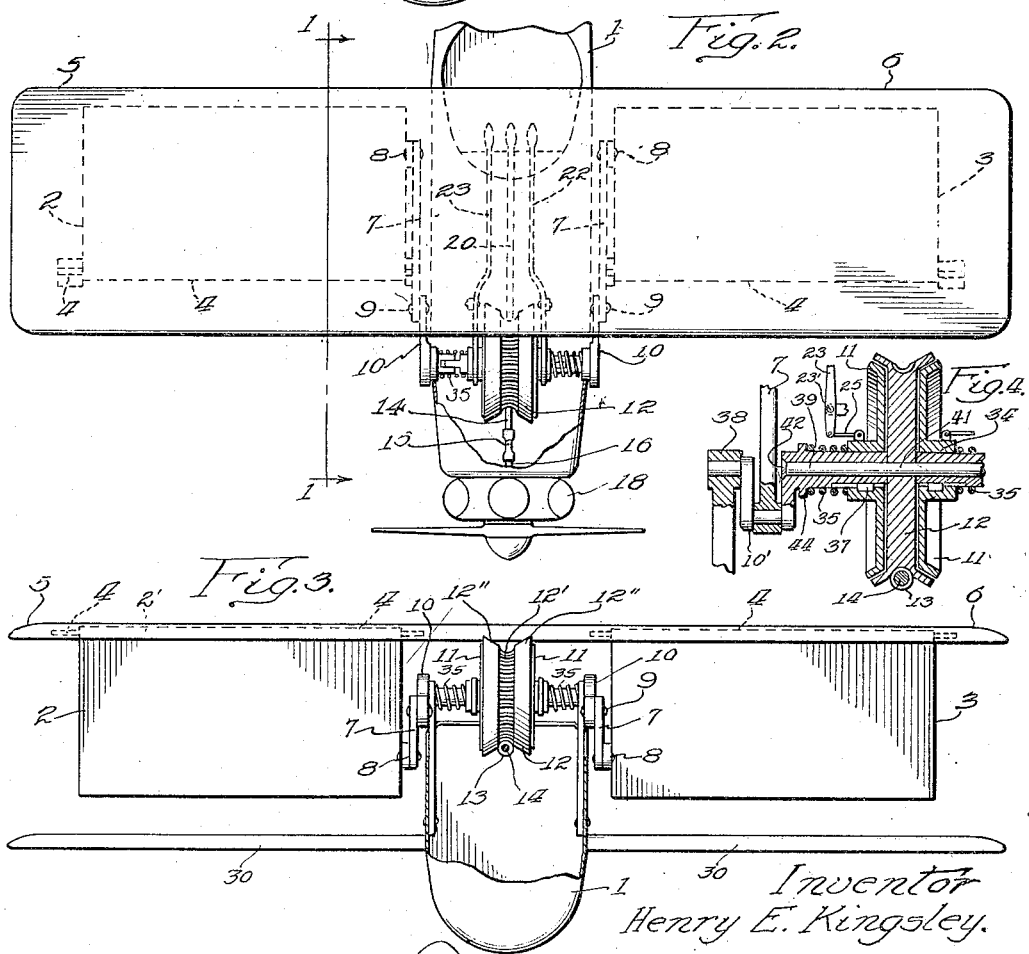

1,845,420

UNITED STATES PATENT OFFICE

HENRY E. KINGSLEY, OF CHICAGO, ILLINOIS

AIRPLANE

Application filed December 26, 1929. Serial No. 416,528.

This invention relates to aircraft and especially to wing foils and the like, for heavier than air devices, such for instance as airplanes and seaplanes, and is mainly concerned with landing operations and with steering.

The main objects of the invention are to enlarge the range of control of aircraft; to provide for air-braking and furthermore for simulating a wing-flap retarding action in landing, especially after grounding; to provide for the practical making of "flat" turns in the air; to provide for enhancing the soaring and gliding possibilities of airplanes; to provide for power operation at will of appropriate right and left wing foils; to provide for individual selective manual control of the operation and use of such foils; to provide especially an air foil power brake; and to provide for applying such novel control apparatus to aircraft of the usual general design.

An illustrative embodiment of this invention is shown more or less conventionally by the accompanying drawings in which:—

Figure 1 is mainly a right side elevation of a biplane with the wings shown in vertical section on the line 1—1 of Figure 2 and with part of the chassis housing broken away to show the novel control mechanism.

Fig. 2 is a top plan of the device shown in Fig. 1.

Fig. 3 is mainly a front view of the craft with the foremost part shown in vertical section on the line 3—3 of Fig. 1, and the landing gear omitted.

Fig. 4 is a fragmentary detail illustrating more fully and specifically the mechanical principles of the power clutch and foil control means, only one side of the duplex clutch etc. being shown.

In the construction shown, the biplane 1 has the novel control foils 2 and 3 hinged, as at 4, in pockets on the forward under part of the upper wings 5 and 6 respectively. These foils are controlled each by a link 7, each link being pivoted at one end, as at 8, adjacent to the free edge of the corresponding foil, and the opposite end of the link being pivoted at 9 to a crank arm 10.

Each crank arm 10 is rigidly and co-turnably connected to a corresponding clutch member 11. These two clutch members are mounted in co-axial horizontal alinement and are axially slidable crosswise of the chassis to releasably engage the corresponding adjacent faces of a driving disk 12, which is also rotatable co-axially with members 11 and is provided with peripheral teeth 12′ to mesh with a worm gear 13.

Said worm gear 13 is mounted co-axially on a shaft 14, which extends forwardly and is connected by a universal joint 15 to another shaft 16, which may be an extension of the shaft of the propeller engine 18. The reverse end or rear part of shaft 14 has a swivel connection 19 for a manual control handle 20. The worm disk 12 has outwardly divergent conoidal flanges 12″ to help guide the worm shaft into proper registry for coaction of the gear wheel and worm, when the handle 20 is raised, as will be apparent.

Each clutch disk 11 has a manual control lever 22 and 23, left and right, respectively, connected to its hub for controlling its engagement with the worm disk 12.

The lower wing 30, the landing wheels 31, and the seat 32, are mounted and arranged as usual. The main gear lever 20 and the individual levers 22 are all grouped within ready reach and control respecting seat 32. The clutch members 11 are urged inwardly by compression springs 35, so that both foils are normally connected for flapping operation, or raising or lowering by power. If one of the foils is to remain at rest while the other operates, as in flat turning, the idle foil is thrown out of clutch connection by operating the corresponding lever 22, and the active foil is actuated by raising lever 20.

Referring to Fig. 4 for more specific clutch gear detail, the rod 7 is actuated by crank member 10' which at 37 is keyed slidably to clutch part 11 and turns freely on block 38 and shaft 39 is keyed at 41 to gear disk 12, and is headed at 42. Member 10' is shouldered at 44 to seat spring 35.

The method of operating an aircraft equipped with the foregoing improvements is mainly as follows:

After the craft has gained altitude with the foils 2 set as shown in Figure 1, and in case a strong wind is blowing in the desired direction of travel, the foils 2 may be lowered and then the engine may be throttled down whereupon the craft will coast or glide steadily for a long distance as it gradually loses altitude. When the altitude has so diminished that continuance of this method is inadvisable, the engine may be accelerated and the foils raised, whereupon altitude may be regained in the usual manner.

Upon landing, in the usual way, and substantially as soon as a three point contact is made with the ground, the power brake feature may be utilized, merely by throwing the worm 13 into gear with wheel 12. By this means the foils may be oscillated rapidly, simulating largely the wings of a bird in landing, the result being to diminish speed by air braking.

An alternative use of this invention is in making flat turns preferably at high altitudes and moderate speed. In this instance a right or left turn is effected mainly but not wholly by lowering the corresponding right or left foil 3 or 2. The deflective lift of the foil as it is lowered is offset by opposite aileron action, at the will of the operator. For instance, lowering the right foil and leaving it lowered temporarily and at the same time banking with the left aileron will cause the craft to make a flat turn to the right without loss of flying speed.

Referring particularly to the operative control levers 20, 22 and 23, whenever foils 2 and 3 or either of them, are to be operated, the pilot grasps the handle or lever 20, and lifting the same, throws the engine driven worm 13 into engagement with the driving gear wheel 12. This, through coaction with the friction clutch discs 11, operates the crank member 10, corresponding links 7, and foils 2 and 3. As soon as the foils attain the desired position the handle 20 is reversed to disengage the worm 3, whereupon the actuating mechanism stops and the foils remain where set.

In case actuation of any one of the foils is desired, as in flat turning, the control handle 22 or 23 is operated manually to disengage the corresponding clutch.

If, for instance, it is desired to make a left turn, the operator first operates handle 23 to disengage the right clutch, which thus permits the right foil to remain in its normal horizontal position, while the opposite foil is lowered by raising the lever 20 and throwing the foil control mechanism into gear with the engine.

If a right turn is desired, the left handle 22 is operated to release the left clutch disc, so that the left foil will remain up when the right foil is subsequently lowered by throwing the control mechanism into gear by raising handle 20.

It is apparent that when simultaneous action of both foils is desired, it is merely necessary to raise the handle 20 and such action may be rendered intermittent by corresponding raising and lowering of said handle 20. If the handle 20 is held up continuously, the foils 2 and 3 continue to oscillate by a sort of flapping action, the speed of which depends upon the design of the gear mechanism 12—13. The appropriate oscillating speed in any instance depends upon the size of the craft and the corresponding specific needs.

Although but one specific embodiment of this invention is herein shown and described, it is to be understood that some of the details of structure and mode of operation may be altered or omitted without departing from the spirit of this invention as defined by the following claims.

I claim:

1. An airplane having rigid right and left wings in combination with rigidly planar foils underlying and hinged at their front edges to said wings respectively on a common axis disposed longitudinally thereof, and power means to flap said foils relative to said wings.

2. An airplane having right and left wings, rigidly planar foils underlying said wings and hinged thereto adjacent to their forward edges for swinging to and fro forwardly and downwardly in one direction, and reversely in the opposite direction, on an axis extending lengthwise of said wings, a common source of power on said airplane, and manually controlled mechanical means operatively connecting said foils respectively to said source of power, said means each including a rotatable crank member to flap said foils respectively.

3. An airplane having a pair of foils swingingly mounted on opposite sides and on hinge axes disposed transversely of the airplane, a source of power, a central clutch member, manually controlled means comprising a pivotally adjustable worm shaft having a handle on its free end for connecting said clutch member to said source of power and a pair of inwardly spring urged movable clutch members on opposite sides of the first mentioned clutch member subject to manual control and operating control means for connecting the laterally disposed clutch members to said foils, whereby the latter may be operated either together or selectively.

4. An airplane having manually alined right and left wings in combination with simplex foils hinged directly to the forward portions of said wings respectively on fixedly alined axes parallel with said wings, and mechanically automatic means for continuously flapping said foils.

Signed at Chicago this 23rd day of December, 1929.

HENRY E. KINGSLEY.